June 14, 1966 R. W. BUTLER 3,255,871
MEANS OF PRESERVING AND TRANSPORTING BIOLOGICAL MATERIALS
Filed March 30, 1964

INVENTOR.
ROBERT W. BUTLER
BY
ATTORNEY

United States Patent Office 3,255,871
Patented June 14, 1966

3,255,871
MEANS OF PRESERVING AND TRANSPORTING BIOLOGICAL MATERIALS
Robert W. Butler, P.O. Box E, Johnson, Kans.
Filed Mar. 30, 1964, Ser. No. 355,813
3 Claims. (Cl. 206—46)

My invention concerns means and methods for preserving biological material and transporting the same to a laboratory for pathological examination. Briefly, the invention includes the use of a translucent plastic bag in which a formaldehyde solution is formed in situ, the bags before use having sealed therein paraformaldehyde powder or tablet, the solution being formed by opening one end of the bag and adding water to a fill line from a hot tap water source. The bag is adapted to be sealed in transportable condition after the solution is formed therein and the biological materials are deposited.

Many doctors' offices and hospitals do not have laboratory facilities for pathological examination of all biological materials that need to be analyzed. Sometimes the needed laboratory facilities are some distance away, requiring use of the mail service or other means of transportation. It is an object of my invention to provide means for preserving biological materials and transporting the same by mail or other carrier.

I have discovered that a 5–10% formaldehyde solution, adequate for the purpose of preserving biological materials during the period until delivery to a laboratory, can be formed by adding hot tap water to paraformaldehyde, either in powder or tablet form. It is an object of my invention to utilize the above method of forming a formaldehyde solution in a means and method for preserving biological material and transporting the same to a laboratory for pathological examination.

It is desirable to minimize the space in a doctor's office or hospital required for a means for transporting biological materials to a remote laboratory, and it is desirable during the transportation that the material in its total shipping container should have minimum weight— particularly if a commercial carrier or postal service is to be used. It is also desirable that the means for preserving and transporting the biological materials should require a minimum of time and operations to prepare the shipment after the biological material is obtained. A further object of my invention is to achieve the above described desirable features.

Further objectives of my invention include: to provide a container which is compact, unbreakable, easily transportable and may be sent by postal mail or other carrier without incurring excessive charges, and to provide a container and a preservative for biological materials which are so economical in cost that they may be disposed of after a single usage.

My invention will be understood, together with further objectives and advantages, thereof from the following description, read with reference to the drawings, in which.

Figure 1:
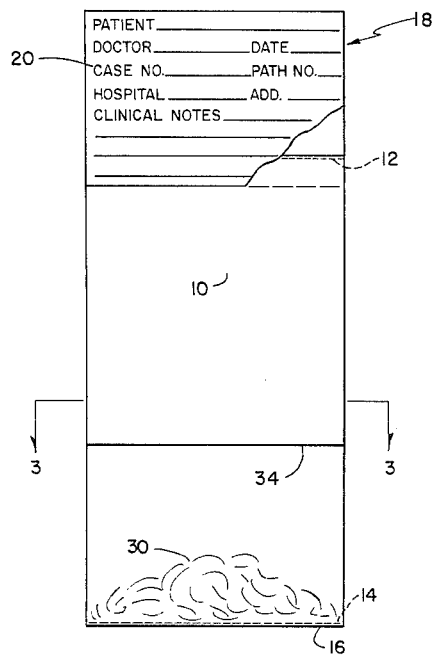
FIGURE 1 is a view of one face of means for preserving and transporting biological materials, forming a specific embodiment of my invention.
Figure 4:
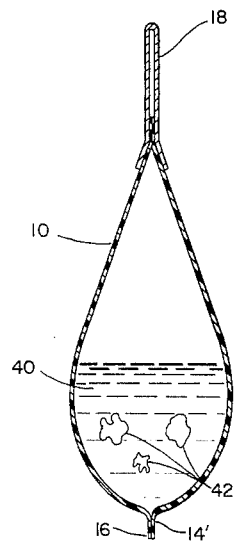
FIGURE 4 is an elevational cross-sectional view of the means shown in the other figures, with the exception that the bag is shown filled with a solution and containing biological materials.
Figure 2:
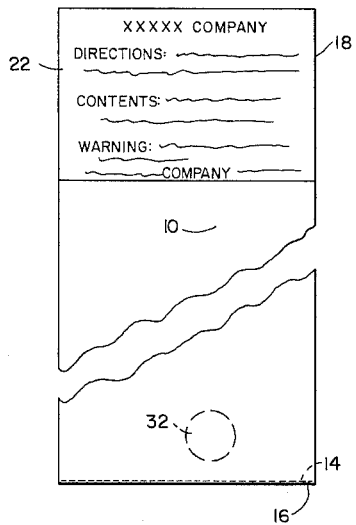
FIGURE 2 is similar to FIGURE 1 only being broken and viewing the opposite face of said means, and showing a tablet instead of powder.
Figure 3:
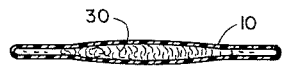
FIGURE 3 is a view primarily in section taken on line 3—3 of FIGURE 1.

The drawings show a pliable, translucent plastic bag 10. This may be polyethylene or another plastic, which should be thermoplastic if heat-sealing is to be used. FIGURES 1 and 2 show the bag as being heat-sealed at the ends of 12 and 14. FIGURE 4 shows end 16 as being resealed at 14'.

Whereas labeling may be accomplished directly on the bag, it will be preferable in most occasions to provide a separate paper label 18 as shown. On a first side 20 of label 18, the nature, source and identification of biological materials may be shown, for example as follows:

| Patient | | Richard Roe | |
|---|---|---|---|
| Doctor | J. Hancock | Date | 3/13/64 |
| Case No. | 64-2477 | Path. No. | 64-1420 |
| Hospital | Wichita General | Address | Wichita, Kansas |
| Clinical Notes | Tonsil Tissue | xxxxxxxxxxxxxxxxxxxxxxxxxxxxxxxx | |
| xxxxxxxxxxxxxxxxxxxxxxxxxxxxxxxxxxxxxxxxxxxxxxxxxxxxxxxxxxxx | | | |
| xxxxx | | | |

On the other side 22 of label 18, directions for use may be given, for example:

DIRECTION: Open other end of bag and add 100-ml. of hot tap water. Twist end closed and shake until powder dissolves. Place specimen in solution and reseal container.
CONTENTS: Paraformaldehyde powder.
WARNING: POISON—may cause irritation of skin, eyes, nose and throat. Avoid prolonged or repeated contact. Avoid breathing dust or prolonged breathing of vapor.

When manufactured, bag 10 has sealed inside a quantity of paraformaldehyde powder 30 or a tablet 32 formed of paraformaldehyde with suitable materials to bind the same into a tablet form and an agent to assist in rapidly distintegrating the tablet when water is added, such as effervescent agent.

FIGURE 4 shows the bag in filled condition with a formaldehyde solution 40 in the bag with biological materials 42 in the solution.

The operation of the means and method for preserving biological materials and transporting same to a laboratory for pathological examination is as follows:

(1) Bags 10 may be formed very economically with mass production methods of manufacture. It is contemplated in the drawings that the bags will be cut from a strip of tubing and that a continuous method of manufacture may be used in which the paraformaldehyde powder or tablet is deposited within the severed lengths of the tubing, the bag heat-sealed at both ends, and the label 18 applied in a continuous operaion. The label may be secured with a heat-sensitive coating applied to its interior surfaces. The bag 10 will be manufactured probably with a fill line 34 printed thereon. This will mean that the article itself may be used as the means of measuring within the rather broad tolerances applicable.

(2) Bags 10 with the paraformaldehyde therein can be shipped to the doctor's office or hospital and stored in folded or superposed condition so as to be very compact.

(3) When some biological materials are ready to be transported, end 16 of bag 10 is severed as by cutting with scissors. I have discovered that a solution of formaldehyde adequate for the purpose of preserving and transporting biological materials, until they can be processed by a laboratory can be obtained by the use of paraformaldehyde either in a powder or tablet form and by the addition of hot tap water (i.e., in the vicinity of 180° F.). This means that after end 16 is severed, the solution can be prepared merely by running the tap until the water has reached maximum temperature and then adding the water to the translucent bag until the fill line 34 is reached (of course, the end 16 of the bag will be upward). The end of the bag can be twisted shut and the contents shaken. It will be found the formaldehyde solution is formed quite rapidly. As the compacting of paraformaldehyde powder into a tablet which is firm and readily dissolvable, is within the common skill of the art, no details are given. One advantage of the tablet over powder is in ease of assembly in manufacture. The bag 10 can be provided in several sizes and various amounts of paraformaldehyde may be used, with the fill line 34 specifying larger amounts of water with larger amounts of paraformaldehyde. The most common bag size provides for 100 c.c. of solution (to fill line 34). Larger bags are provided for sizable specimens in 200 c.c. and 300 c.c. sizes. The amount of paraformaldehyde provided in each package should be sufficient to form a 5–10% solution and preferably the paraformaldehyde is provided in an amount designed for a 7½% of solution, which provides sufficient tolerances for manufacturer to insure the 5–10% limits will be met.

(4) After the solution 40 is formed and the biological materials 42 are added, the bag may be resealed at 14'. One means of resealing is a simple heater, forming a new heat seal 14', which can be readily accomplished if a thermoplastic plastic such as polyethylene is used. Other means of resealing the bag may be substituted, such as an adhesive tape.

(5) The bag, with the specimens in place as shown in FIGURE 4, can be transmitted by air mail, first-class mail, parcel post, or other carrier. In such long distance transportation, the bag 10 will be placed in a suitable shipping carton.

Although in the specification and claims paraformaldehyde and formaldehyde solution have been specified and are preferred, the terms should be taken to cover any equivalent materials which can be processed in the same manner and will form a suitable preservative.

Having thus specifically described my invention, I do not wish to be limited to the precise details shown and described but instead wish to cover modifications that may naturally occur to those skilled in the art after learning of my invention, and properly covered by my invention.

I claim:
1. In the preservation of biological material, a tissue enclosing and shipping device comprising:
   (a) a length of tubular pliable heat sealable translucent plastic sheet material having an upper end and a lower end, said tubular material being transversely collapsed forming a flat rectangular configuration with opposed wall outer faces,
   (b) said material having a transverse seal extending along said upper and lower ends and entirely across said wall outer faces forming a closed flat container having a containing capacity defined by the limit of swelling out of said tubular sheet material, said lower end transverse seal being severable along the entire length thereof for selectively completely opening said container lower end, said lower end being amenable to resealing,
   (c) a paper label having opposed faces, said label being secured to said sheet material at said upper end and extending upwardly beyond said upper end with said label faces respectively forming substantial continuations of said wall faces, at least one of said label faces having instructional indicia printed thereon relating to the proper use of said container for forming liquid tissue preserving solution therein and receiving and transporting tissue therein in contact with said solution,
   (d) at least one of said label faces having indicia printed thereon indicating locations thereon to receive written identifying and clinical information relating to said tissue,
   (e) said closed container having a quantity of toxic formaldehyde type water soluble dry tissue preservative precursor disposed therein which, upon adding water thereto within said capacity of said container according to said instructional indicia, produces a formaldehyde type tissue preserving solution of predetermined concentration, said quantity of said precursor being relatively small with respect to said container capacity whereupon said container remains substantially flat,
   (f) thus upon inversion of said container and severing said lower end seal and insertion of said quantity of water and tissue, said lower end is resealed for containing said specimen in contact with said tissue preserving solution prior to shipment.

2. The combination as set forth in claim 1 wherein:
   (a) said dry tissue preservative precursor is in the form of a powder.

3. The combination as set forth in claim 1 wherein:
   (a) said dry tissue preservative precursor is in the form of a flat tablet.

References Cited by the Examiner
UNITED STATES PATENTS

| | | |
|---|---|---|
| 537,146 | 4/1895 | Froehlich. |
| 2,863,305 | 12/1958 | Shepherd _____ 206—84 X |
| 3,107,805 | 10/1963 | Asher _____ 206—46 X |

FOREIGN PATENTS

| | | |
|---|---|---|
| 905,463 | 9/1962 | Great Britain. |

References Cited by the Applicant
UNITED STATES PATENTS

| | | |
|---|---|---|
| 2,480,500 | 8/1949 | Moore. |
| 3,014,638 | 12/1961 | Farley. |
| 3,017,070 | 1/1962 | London. |

THERON E. CONDON, *Primary Examiner.*

GEORGE O. RALSTON, *Examiner.*

J. M. CASKIE, *Assistant Examiner.*